(12) United States Patent
Jäntti

(10) Patent No.: US 8,430,621 B2
(45) Date of Patent: Apr. 30, 2013

(54) CONTROL OF A BOOM CONSTRUCTION AND A TOOL ARTICULATED THERETO

(75) Inventor: Jarkko Jäntti, Tampere (FI)

(73) Assignee: John Deere Forestry Oy, Tampere (FI)

( * ) Notice: Subject to any disclaimer, the term of this patent is extended or adjusted under 35 U.S.C. 154(b) by 1220 days.

(21) Appl. No.: 11/832,354

(22) Filed: Aug. 1, 2007

(65) Prior Publication Data

US 2008/0041805 A1   Feb. 21, 2008

(30) Foreign Application Priority Data

Aug. 16, 2006   (FI) ..................................... 20065515

(51) Int. Cl.
   *B66C 23/00*   (2006.01)

(52) U.S. Cl.
   USPC ............ 414/699; 414/815; 414/700; 414/701

(58) Field of Classification Search ......................... None
   See application file for complete search history.

(56) References Cited

U.S. PATENT DOCUMENTS

| | | | |
|---|---|---|---|
| 3,252,525 A | 5/1966 | Pyles | |
| 3,536,216 A | 10/1970 | Brownell et al. | |
| 3,547,293 A | 12/1970 | Borer et al. | |
| 3,659,734 A | 5/1972 | Fuzzell | |
| 3,884,359 A | 5/1975 | Suverkrop | |
| 4,011,959 A | 3/1977 | Papasideris | |
| 4,037,519 A | 7/1977 | Miller et al. | |
| 4,377,043 A | 3/1983 | Inui et al. | |
| 4,775,288 A | 10/1988 | Dimitriu | |
| 4,844,685 A | 7/1989 | Sagaser | |
| 4,923,362 A | 5/1990 | Fryk | |
| 5,083,894 A | 1/1992 | Ikari et al. | |

(Continued)

FOREIGN PATENT DOCUMENTS

| CA | 2196728 | | 8/1998 |
|---|---|---|---|
| CA | 2196728 | A1 | 8/1998 |

(Continued)

OTHER PUBLICATIONS

Communication from the European Patent Office dated Jan. 7, 2008, (8 pages).

(Continued)

*Primary Examiner* — Paul T Chin
*Assistant Examiner* — Willie Berry, Jr.

(57) ABSTRACT

A method for controlling a boom construction and a tool articulated thereto, the boom construction comprising a first boom and a first actuator controlling the same, a second boom articulated to the first boom, and a second actuator controlling the same, as well as a third actuator controlling the position of the tool, wherein in the method: the first actuator is controlled manually; and/or the second actuator is controlled manually and the third actuator is also controlled at the same time automatically to control the position of the tool. For example, the first actuator is controlled by use of a first set point; and/or the second actuator is controlled by use of a second set point; and in addition, the third actuator is controlled simultaneously by using for the control a variable dependent on at least one of said set points. For example, the control system of the boom construction and the tool articulated thereto comprises a control algorithm, which has been configured to determine the variable which is dependent on at least one of the set points.

8 Claims, 3 Drawing Sheets

U.S. PATENT DOCUMENTS

| | | | |
|---|---|---|---|
| 5,116,186 | A | 5/1992 | Hanamoto et al. |
| 5,160,239 | A | 11/1992 | Allen et al. |
| 5,356,260 | A | 10/1994 | Ikari et al. |
| 5,405,237 | A | 4/1995 | Oka |
| 5,424,623 | A | 6/1995 | Allen et al. |
| 6,173,973 | B1 | 1/2001 | Robinson |
| 6,233,511 | B1 | 5/2001 | Berger et al. |
| 6,443,196 | B1 | 9/2002 | Kurelek |
| 6,557,453 | B2 | 5/2003 | Paakkunainen et al. |
| 6,609,315 | B1 | 8/2003 | Hendron et al. |
| 6,763,619 | B2 | 7/2004 | Hendron et al. |
| 6,860,703 | B2 | 3/2005 | Carroll, Jr. |
| 6,896,088 | B2 * | 5/2005 | Dahl et al. ............ 180/305 |
| 6,997,221 | B2 | 2/2006 | Kurelek et al. |
| 7,036,248 | B2 | 5/2006 | Meyeres et al. |
| 7,222,444 | B2 | 5/2007 | Hendron et al. |
| 2002/0040741 | A1 | 4/2002 | Ristolainen |
| 2003/0205291 | A1 | 11/2003 | DiSabatino |
| 2004/0083628 | A1 | 5/2004 | Hendron et al. |
| 2006/0096137 | A1 | 5/2006 | Hendron et al. |

FOREIGN PATENT DOCUMENTS

| | | |
|---|---|---|
| EP | 1640512 A2 | 3/2006 |
| FI | 910197 | 7/1992 |
| JP | 57130639 A | 8/1982 |
| JP | 60133126 A | 7/1985 |
| WO | 01/02280 A | 1/2001 |
| WO | 0102280 A1 | 11/2001 |

OTHER PUBLICATIONS

English Abstract for JP 57 130639 A (1 page).
English Abstract for JP 60 133126 A (1 page).
Communicatoin from European Patent Office (Jul. 28, 2008) (19 pages).
English Abstact of JP 57130539 (1 page).
English Abstract of JP 60133126 (1 page).
Office Action from Finnish Patent Office re Finnish Patent Application No. 20065515 with English Translation (8 pages) (May 10, 2007).

* cited by examiner

CONTROL OF A BOOM CONSTRUCTION AND A TOOL ARTICULATED THERETO

FIELD OF THE INVENTION

The invention relates to a method for controlling a boom construction and a tool articulated thereto. The invention also relates to a system for controlling a boom construction and a tool to be articulated thereto.

The invention relates to hydraulically controlled boom systems, to which a felling head is coupled, particularly a boom system for a feller buncher, and its control.

BACKGROUND OF THE INVENTION

Felling heads are widely used for the cutting and collecting of upright growing trees. In most cases, several tree trunks can be collected in the felling heads until the tree trunks are unloaded onto the ground. After this, the tree trunks are transported elsewhere by means of either a forwarder or a skidder. The boom system and the felling head are normally coupled to a high-power vehicle, such as a feller buncher, of which an example is given in U.S. Pat. No. 6,173,973 B1. Some felling heads are disclosed in documents US 2003/02025291 A1 and US 2002/0040741 A1. A felling head and a feller buncher are also disclosed in Canadian publication 2,196,728 A1. Vehicles provided with a horizontal movement of the boom are disclosed in publications U.S. Pat. No. 6,443,196 B1 and U.S. Pat. No. 6,997,221 B2.

The feller buncher normally comprises a lower carriage and an upper carriage. The lower carriage is equipped, for example, with two caterpillar tracks, by means of which the forest machine moves on a terrain. Above the traverser of the lower carriage, an upper construction is placed, comprising, inter alia, a cabin, an engine and an articulated boom construction. The boom construction has for example two parts, comprising a hoist boom and a stick boom, the felling head being articulated at the end of the stick boom.

The cabin of the feller buncher is provided with two control levers or control handles for the operator. The control levers are typically movable in two directions: forward-backward (y-axis) and to the left-right (x-axis). By means of the y-direction, one of the two control levers controls the position of the hoist boom (hoist function) and the other the position of the stick boom (stick function). In a corresponding manner, by means of the x-direction, one of the control levers typically controls the rotation of the upper carriage and the other the position of the felling head.

For bringing the felling head to the tree to be felled, the driver normally has to operate both of the control levers in the y-direction (hoist and stick functions). Because the movement of the hoist boom and/or the stick boom continuously changes the position of the felling head with respect to the ground, at least one of the control levers must also be moved in the x-direction. For felling the tree, the felling head is equipped with, for example, a saw that must be kept in the horizontal plane. A corresponding simultaneous operation of the control levers is required when the tree has been gripped in the felling head and the felling head together with the tree is moved towards new trees to be felled, or when a collected bunch of trees is unloaded onto the ground in a controlled manner for emptying the felling head. Consequently, in practice, the driver must almost all the time control said hoist and stick functions and the position of the felling head simultaneously, and moreover, he typically rotates the upper carriage. The control of the boom construction and the keeping of the felling head in the correct position require significant alertness and skill of the operator. The simultaneous manipulation of several control levers is difficult and may slow down the function.

SUMMARY OF THE INVENTION

The method according to the invention for controlling the boom construction and the tool articulated to it is presented in the claims section herein. The system according to the invention for controlling the boom construction and the tool articulated to it is presented in the claims section herein.

Thanks to the invention, the operator does not need to separately take care of changing the position of the felling head, when the position of the hoist boom and/or the stick boom is changed. The control system will automatically take care of maintaining the position of the felling head, for example, upright when the position of the hoist boom and/or the stick boom is changed. The control system allows the operator to change the position of the felling head.

The invention makes the work of the operator easier and faster. With the invention, the need for the operator to control the position of the felling head by an x-movement of one of the two control levers will become minimal. In practice, keeping the felling head straight, which requires accuracy and skill, will be a fully automatic function. The operator will only use the x-movement of the control lever primarily for unloading the bunches of trees collected in the felling head and for returning the felling head to the upright position.

The manipulation of the control levers can be simplified further, when the position of both the hoist boom and the stick boom is simultaneously controlled automatically by using only one control lever. This function is used for achieving a substantially linear movement of the head of the stick boom. Now, the felling head remains, for example, at a constant height when it is moved farther away or closer to the forest machine by means of both the hoist boom and the stick boom. The function is called a horizontal or parallel movement which is in most cases substantially horizontal and which is controlled, for example, by the control lever controlling the position of the hoist boom. In addition to the parallel movement, the control system also allows the operator to change the position of the hoist boom. In this way, the motion angle or height can be easily adjusted, if necessary, by the control lever for the hoist movement.

The automatic control of the position of the felling head and the functions of the parallel movement can be combined. Thus, the manipulation of the machine becomes very easy. By only one movement of the control lever (for example, the y-axis normally controlling the stick boom), the felling head can be driven outwards and inwards in the horizontal direction while the felling head remains in a set position, for example upright.

By means of the invention, it is possible to automate and combine functions, wherein the manipulation and operation of the boom system will be simpler and faster. The implementation is electronic and allows easy modification. The invention makes it possible to implement the levelling of a tool, for example the felling head, without sensors for measuring the position of the felling head, or at least the need for them is substantially reduced.

The invention can be applied in various boom constructions in which tools are fixed by articulation so that the tools can be turned around a substantially horizontal line by means of a working cylinder fixed, on one hand, to the boom construction and, on the other hand, to the tool or an adapter for articulating the tool at the end of the boom construction. Applications include particularly forest machines, harvesters, forwarders or combinations of them, in which for example a thinning and collecting tool according to application FI-910197, or a collecting tool functioning on a corresponding principle, is connected to the end of the boom construction for the collection of fuel wood. The tool typically comprises a frame, to which arms are articulated for collecting one or more tree trunks, and a cross-cutting device for cross-cutting the tree which has been clamped. In most cases, cross-cutting devices operating by the guillotine principle or chain saws are used.

The invention can be applied, for example, in excavators, for controlling either a felling head that is available as an accessory for them, or the actual bucket. In excavators, the boom construction, the lower structure and the upper structure correspond to feller bunchers rather accurately.

The invention can also be applied in boom constructions of forest machines, in which the structure is configured solely for the parallel movement. The boom construction comprises a transfer cylinder which is effective, for example by means of an articulated mechanism, on the position of the two booms in the boom construction. The control system will automatically take care of the position of the tool when the position of the booms is changed.

The structure of the boom construction, the placing of the corresponding actuators, and the articulated mechanism related to the actuator may vary in boom constructions applying the invention. The placement and function of the actuator correspond, for example, to the solution of WO 01/02280 A1, in which a parallel movement is also achieved by the actuators.

The other advantages and the details of the invention will be presented in the more detailed description and the drawings of the invention.

DESCRIPTION OF THE PREFERRED EMBODIMENT

In the following, we shall describe in more detail the way of controlling the boom construction by means of the control system when the boom construction is coupled to a motor vehicle which is a working machine. Thus, a suitable tool is coupled to the end of the boom construction for accomplishing the work.

Figure 1:
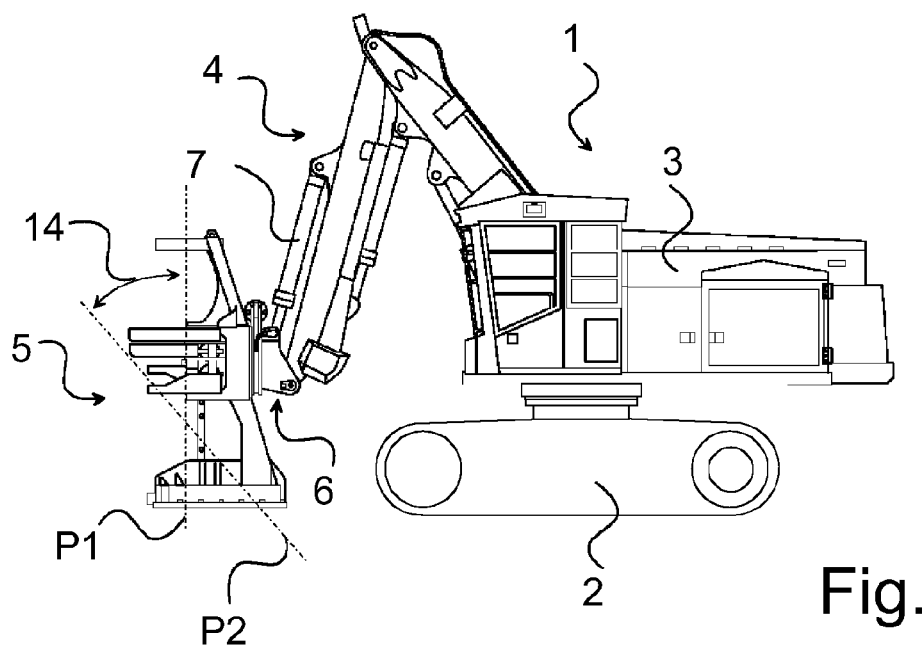
FIG. 1 shows, in a side view, a forest machine which is a feller buncher and in which the invention is applied, the felling head being close to the forest machine.
Figure 2:
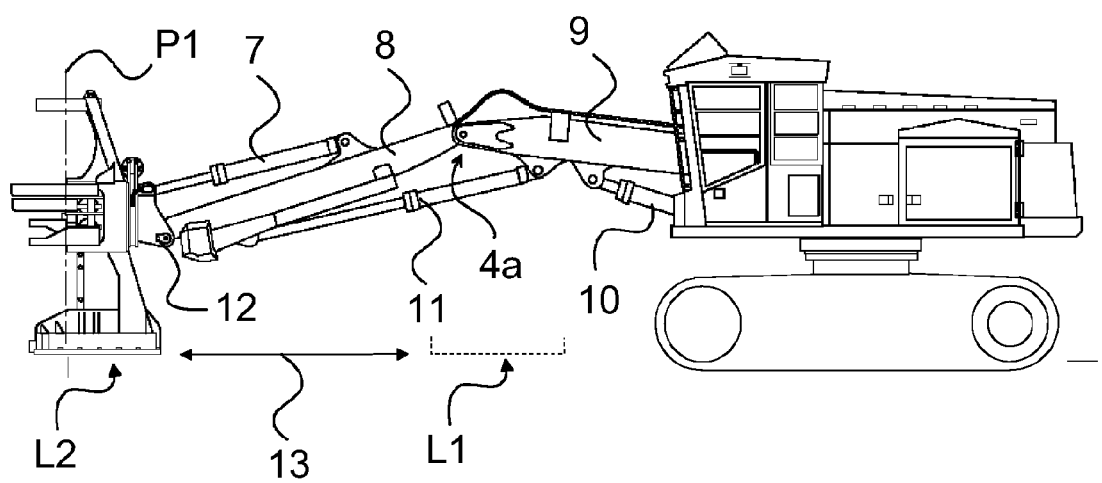
FIG. 2 shows, in a side view, the forest machine of FIG. 1 in a situation in which the felling head has been transferred far away from the forest machine by means of the boom construction.

FIGS. 1 and 2 show a vehicle which is a forest machine and particularly a feller buncher 1. The feller buncher comprises a lower carriage 2, by means of which the feller buncher moves on a terrain. The lower carriage 2 is equipped with for example two caterpillar tracks. On top of the traverser of the lower carriage 2, an upper construction 3 is placed, comprising the cabin and the engine. A boom construction 4 is articulated to the upper structure 3. By means of the traverser, the upper structure 3 and the boom construction 4 can be rotated around a vertical line. The boom construction typically comprises two booms, which are also called a hoist boom and a stick boom in this example. In boom constructions intended for a parallel movement, the boom may also be called a transfer boom. In FIGS. 1 and 2, the boom construction 4 has two parts, comprising a hoist boom 9 and a stick boom 8, the felling head 5 being coupled to the end of the stick boom 8. The felling head 5 is used as the tool of the working machine.

For the movement, the boom construction comprises actuators which in this example are working cylinders and which are also called a hoist cylinder and a stick cylinder. In boom constructions intended for the parallel movement, the working cylinder may also be called a transfer cylinder. The end of the hoist boom 9 is coupled by means of an articulation to the upper structure 3, and the outermost end of the hoist boom 9 can be steered up and down. The hoist boom 9 can be moved by one or two hoist cylinders 10 which are fixed by articulation to both the hoist boom 9 and the upper structure 3. The hoist cylinder 10 is a double-acting cylinder whose length, speed of movement and direction of movement can be controlled by means of a pressurized medium, normally hydraulic oil. The medium is a manipulated variable which is affected by a controlling element, such as a valve.

The end of the stick boom 8 is fixed by articulation to the outermost end of the hoist boom 9, and the outermost end of the stick boom 8 can be steered up and down, and simultaneously also forward and backward. The stick boom 8 is moved by a stick cylinder 11 which is fixed by articulation to both the hoist boom 9 and the stick boom 8. The stick cylinder 12 is a double-acting working cylinder 11 whose length, speed of movement and direction of movement are controlled by the pressurized medium. The booms are coupled to each other by a link mechanism 4a, to which the stick cylinder 11 also belongs. The working cylinder is coupled to the boom either directly or by means of a suitable link mechanism.

The felling head 5 is coupled by an articulation 12 at the end of the stick boom 8, and the felling head 5 can be tilted forward and backward around a horizontal line extending via the articulation 12. At the end of the stick boom 8, an adapter 6 for the boom construction is provided, coupled to the felling head 5 and tilting with the felling head 5 around the articulation 12. The felling head 5 is controlled by a tilting cylinder 7 that is articulated to both the stick boom 8 and the felling head 5, in the presented example by means of the adapter 6. The tilting cylinder 7 controls the position of the adapter 6 and simultaneously the tilting of the felling head 5. The tilting cylinder 7 is a double-acting cylinder whose length, speed of movement and direction of movement can be controlled by means of the pressurized medium.

The felling head 5 can also be rotated, for example, around a horizontal line by means of a rotating device fixed between the adapter 6 and the felling head 5. Said horizontal line extends transversely, normally perpendicularly to the line extending via the articulation 12. The adapter 6 and the rotating device also form a part of the felling head 5.

The feller buncher 1, the boom construction 4, the working cylinders 7, 10 and 11, as well as the felling head 5 are known as such with respect to their structure, and the principles applied in them are known to a person skilled in the art. In this description, we shall discuss features which are not known in prior art. The operating principles of the control system of the feller buncher 1 are also known as such, but novel principles according to the invention are applied therein. The modification and configuration of the control system will be obvious for a person skilled in the art on the basis of the description of the invention in this specification.

As shown in FIG. 1, the felling head 5 can be tilted by the tilting cylinder 7 for example from position P1 to position P2 around the articulation 12, wherein the tilting cylinder 7 becomes longer when it moves. As shown in FIG. 2, the felling head 5 can be moved by means of a parallel movement from a location L1 to a location L2 along a substantially horizontal path 13, wherein the hoist cylinder 10 and the stick cylinder 11 act simultaneously. Because the hoist cylinder 10 and the stick cylinder are mounted under the boom construction 4, the hoist cylinder 10 becomes shorter and the stick cylinder becomes longer. The placement of the working cylinders may also vary, wherein the stick cylinder may also be mounted on top of the boom construction 4, in which case the stick cylinder becomes shorter when the felling head 5 is transferred to the location L2. When the felling head 5 is in the location L1, the boom construction 4 is in the position shown in FIG. 1. During the transfer, the felling head 5 is kept, for example, in an upright position P1 by controlling the tilting cylinder 7. The tilting cylinder 7, the hoist cylinder 10 and the stick cylinder 11 operate simultaneously.

Figure 3:
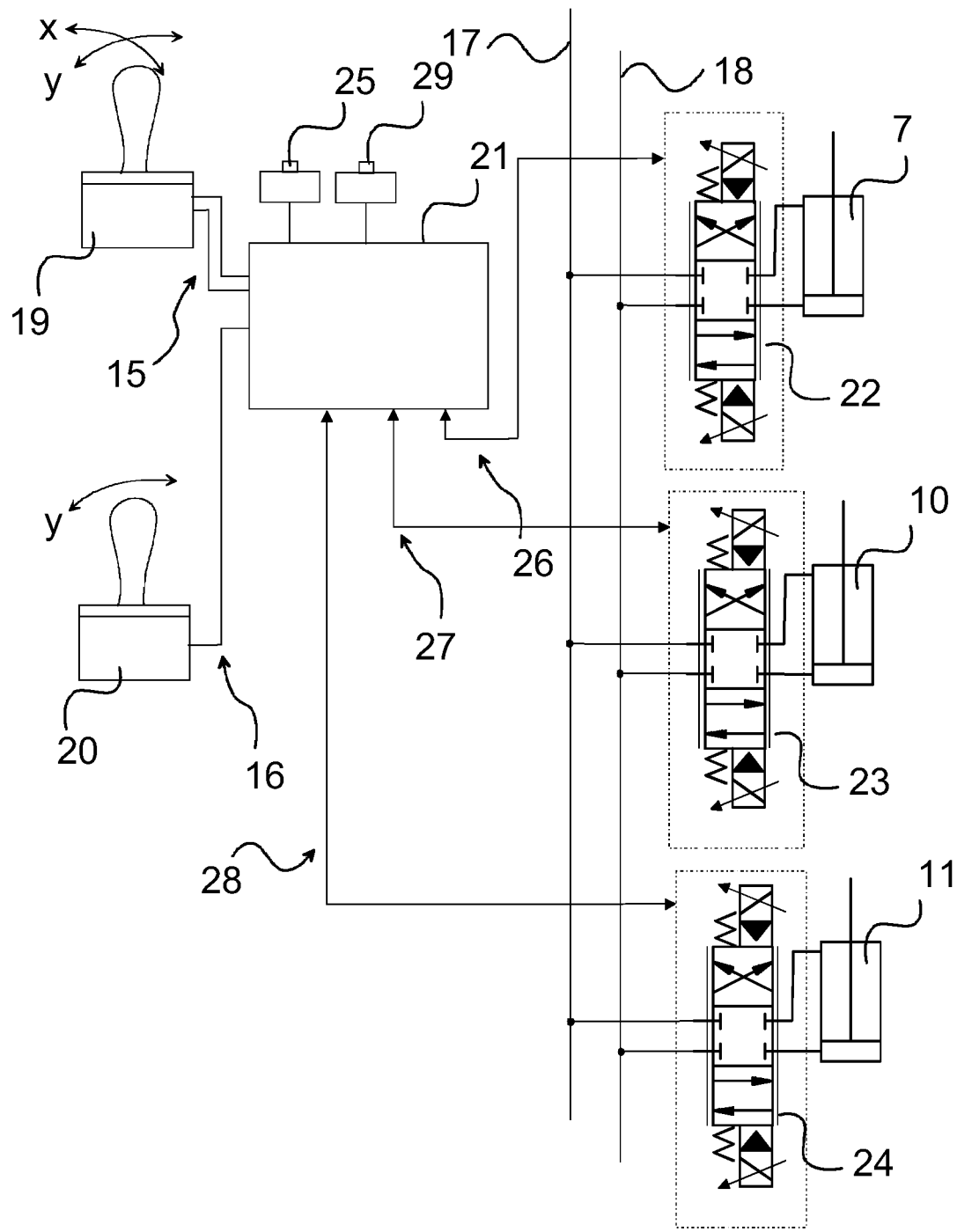
FIG. 3 shows components and the principle of operation of the control system of the forest machine in a reduced chart.

FIG. 3 shows in more detail the operation of the control system 21 for controlling the controlling elements 22, 23 and 24. The controlling elements act on a manipulated variable which in this case is a medium that is led in and out of the working cylinders. The pressure and volume flow of the medium, in turn, control the speed of the working cylinders 7, 10 and 11. The working cylinders, in turn, steer the boom construction 4 into the desired position. Set points 15 and 16 are input in the presented control system 21, the position and movements of the boom construction 4 being dependent on the set points. The operator enters the set points manually by using the necessary equipment, particularly by manipulating control sticks 19 and 20, whose directions of movement correspond to the directions of movement of the working cylinders 7, 10 and 11. In the neutral position of the control stick, the working cylinders remain stationary.

The control system 21 has a link mode, wherein the control stick 19 is used for controlling the stick cylinder 11. For entering the set point, movements in the y-direction are used to make the stick cylinder 11 either shorter or longer. In this example, a set point is also given for the tilting cylinder 7 by means of the control stick 19, wherein movements in the x-direction are used to make the tilting cylinder 7 either shorter or longer. The control stick 20 is used for controlling the hoist cylinder 10, wherein movements in the y-direction are used. In the presented example, a forward movement of the control stick 20 will lower down the boom construction 4, and a backward movement will hoist the boom construction 4. If desired, the control stick 20 has also a movement in the x-direction, which is normally applied for controlling the rotation of the upper carriage. From the above-described control arrangement, it is also possible to obtain, for example, a modification that the y-directions of the control sticks 19 and 20 control the functions crosswise; in other words, the control stick 19 controls the hoist function and the control stick 20 controls the stick function.

In addition to the link mode, the control system 21 also has a parallel mode for the parallel movement, which is activated e.g. by a button 25 provided either in the control stick 19, in its direct vicinity or elsewhere within the reach of the operator. In the parallel mode, the control stick 19 and its set point are used to control both the hoist cylinder 10 and the stick cylinder 11 simultaneously so that, for example, the movement along the route 13 is possible by using only one control stick 19. A forward movement of the control stick 19 in the y-direction will transfer the felling head 5 farther away, and a backward movement will bring the felling head 5 closer to the upper structure 3. Normally, the hoist cylinder 10 can be controlled using the y-direction of the control stick 20 also during the parallel movement. It is also possible to obtain, for example, such a modification of the above-described control arrangement that the y-directions of the control sticks 19 and 20 will control the functions crosswise; in other words, the control stick 19 will control the hoist function and the control stick 20 will control the parallel movement.

The control system 21 also comprises a felling head levelling mode which is activated e.g. with a button 29 which may be provided in the control stick, in its direct vicinity or elsewhere within the reach of the operator. In the felling head levelling mode, the function of the tilting cylinder 7 depends, among other things, on the set points 15 and 16. The operation of the tilting cylinder 7 is controlled on the basis of signals from the control sticks 19 and 20 on the hoist and stick functions, and on the position of the felling head. The felling head levelling mode is available in both the link mode and the parallel mode. When both the felling head levelling mode and the parallel mode are in use, all the working cylinders 7, 10 and 11 can be jointly controlled solely by the y-movement of the control stick 19. The felling head levelling mode can also be taken into use in a control system with no parallel mode.

FIG. 3 also shows in more detail the controlling elements 22, 23 and 24 which are in contact with the medium system comprising a pressure line 17 containing pressurized medium and a return line 18 to which the medium is returned. The medium system is known as such, and it is used to produce the pressure and volume flow of the medium. The medium is a manipulated variable whose entry into the working cylinders 7, 10 and 11 is controlled by the controlling elements 22, 23 and 24. The variable to be controlled is the speed and the direction of movement of the working cylinder, and the controlling variable is e.g. a current signal 26, 27 or 28 obtained from the control system 21. The system may also comprise several separate pressure lines and return lines. The controlling elements 22, 23 and 24 are provided for the tilting cylinder 7, the hoist cylinder 10 and the stick cylinder 11, respectively. In the presented example, the controlling element is a valve controlled by a current signal and providing a volume flow proportional to the current signal to be supplied to the working cylinder. The structure of the control system 21 may differ from that presented, and it may be more distributed, or it may form a part of a larger control system. The control system is, for example, a PC based control system which is known as such and in which the principles of the invention are applied, and which also comprises the applications required for e.g. the control algorithms. The valves are shown on the level of principle and they comprise, for example, electronically controlled three-positioned four-way directional valves. The functions can also be implemented by proportional directional valves. A control and amplifier card coupled to the proportional valve can be used to set e.g. the necessary acceleration and deceleration ramps in a way known as such.

The equipment of the control system comprises, for example, a display module, a PC keyboard and a central unit with a processor and a memory. For implementing the various examples of the invention, the required application and the software included therein are installed in the central processing unit of the control system which comprises the necessary RAM and mass storage. The control system utilizes an operating system known as such, under which the application is run. The equipment and the operating system comprise the applications and protocols necessary for communication with other devices. The operating system is preferably a turnkey system of prior art, which even provides services ready for the transmission of a data stream in e.g. a CAN bus (Controller Area Network).

Figure 4:
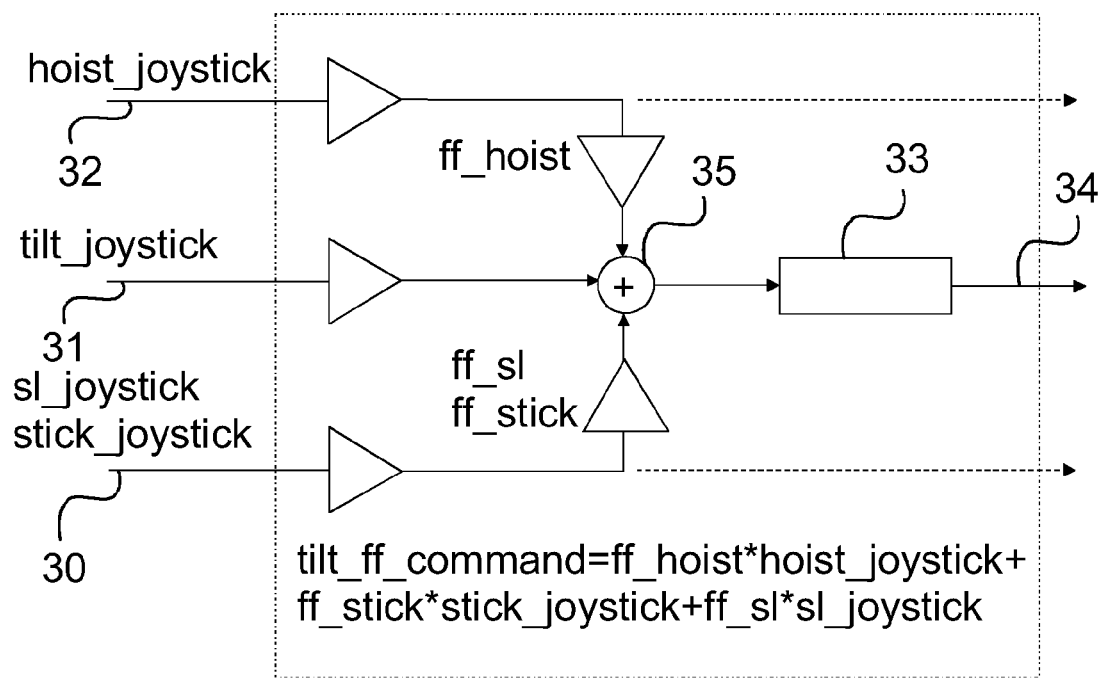
FIG. 4 illustrates the more detailed operation and the control principles of the control system of FIG. 1 in a simplified diagram.

FIG. 4 shows the principle of operation of a control algorithm of the control system which is illustrated by means of inputs 30, 31 and 32 corresponding to the set points of different movements as well as by means of an output 34 corresponding to the controlling variable. The controlling variable is entered in the controlling element and it is used, among other things, for controlling the tilting of the felling head. The control algorithm utilizes stored parameters that can be set. This will be discussed in more detail hereinbelow.

FIG. 4 shows in more detail particularly the operation of the felling head levelling mode, and the other modes operate as will be presented hereinbelow.

We shall first discuss situations in which the felling head levelling mode is not in use. In the link mode, the output 34 that controls the tilting cylinder 7 (tilt_command) is only proportional to the input 31 (tilt_joystick) corresponding to the set point given by means of the x-movement of the control stick 19 (e.g. tilt_command=tilt_joystick). In a corresponding manner, in the link mode and in the parallel mode, the stick cylinder 11 is controlled by an input 30 (stick_joystick, sl_joystick) that corresponds to the y-movement of the control stick 19 (e.g. stick_command=stick_joystick, sl_command=sl_joystick). In a corresponding manner, in the link mode and in the parallel mode, the hoist cylinder 10 is controlled by an input 32 (hoist_joystick) that corresponds to the y-movement of the control stick 20 (e.g. hoist_command=hoist_joystick). Furthermore, the hoist cylinder 10 is controlled by the input 30 (sl_joystick), when the parallel mode is in use (e.g. hoist_command=hoist_joystick+sl_joystick). If desired, the link mode and the mode of the parallel movement can be supplemented with parameters and control means whose principles have been described in connection with the felling head levelling mode.

In the felling head levelling mode, the control algorithm and its output 34 (tilt_command) can be described generally in the form: tilt_command=tilt_joystick+(ff_hoist*hoist_joystick)+(ff_stick*stick_joystick)+(ff_sl*sl_joystick).

In the link mode, when the felling head levelling mode is in use, the output 34 that controls the tilting cylinder 7 (tilt_command) is proportional to the input 30 (stick_joystick) and the parameter ff_stick (e.g. ff_stick*stick_joystick), as well as to the input 31 (tilt_joystick) and also to the input 32 (hoist_joystick) and the parameter ff_hoist (e.g. ff_hoist*hoist_joystick). The parameters ff_stick and ff_hoist are parameters that can be set and some kind of amplifications.

In the parallel mode, when the felling head levelling mode is in use, the control algorithm operates otherwise as described above, except that the input 30 is now sl_joystick, with which the parameter ff_sl is used (e.g. ff_sl*sl_joystick) and which normally differs from the link mode parameter ff_stick. Even though the same control stick 19 is used in the parallel and link modes, the set point 30 varies depending on the selected mode, and the selection of the controlled controlling elements varies.

A summing unit 35 indicates the combined effect of the inputs, and the control member 33 indicates, for example, readjustments related e.g. to possible maximum and minimum values of the output 34. In connection with the control member 33, it is also possible to take other measures relating to the control algorithm, which are considered necessary or which fine-tune the operation.

According to the above example, in the felling head levelling mode, the y-movements of the control sticks 19 and 20 (hoist and stick functions) normally affect the position of the boom construction 4 but now also the position of the felling head 5. When running the hoist or stick function (link mode) or the parallel movement combined of these (parallel mode), the control system takes care of the position of the felling head 5 automatically, but in this example, it is also possible to correct the position of the felling head 5 manually with an x-movement of the control stick 20 (tilt_joystick). The control system operates so that the aim is to maintain the latest position of the felling head set by manual control when using the boom construction.

In the apparatus according to the example, the parallel movement can be achieved by a control algorithm, wherein on the basis of the input 30 (sl_joystick), both the hoist cylinder 10 and the stick cylinder 11 are moved simultaneously by controlling both the controlling element 23 and the controlling element 24 with variables that are proportional to the input 30.

Alternatively, according to prior art, the hoist cylinder 10 and the stick cylinder 11 can be coupled functionally in series by a controlling element so that e.g. the controlling element 24 alone controls both the hoist cylinder 11 and the stick cylinder 11. Thus, the controlling element 24 is controlled with a suitable variable which is proportional to the input 30.

For the parallel movement, according to prior art, boom constructions are provided, to which the working cylinder is coupled so that the working cylinder is effective on the position of two booms. Typically, the boom construction is a link mechanism, by means of which the working cylinder is effective on both booms. Furthermore, another working cylinder is effective on one of the booms for hoisting. The boom construction has a parallel mode but not a link mode.

Good and versatile automatic control of the felling head is achieved by defining at least one parameter for the felling head levelling mode for each direction of movement of the control stick (forward, backward). The parameters can be defined to deviate from the linear to obtain a control that is unlinear in a desired manner, taking into account for example unlinearity or behaviour of the controlling element. Consequently, the parameter may be a function in which the control value is entered.

Thus, the parameter ff_hoist can be divided into two parameters ff_hoist_up and ff_hoist_down, depending on the side on which the control stick 20 is in relation to the neutral position. When hoisting the hoist boom 9, ff_hoist_up is used, and the felling head 5 is tilted forward by maintaining its position, for example P1. In a corresponding manner, when the hoisting boom 9 is lowered down, ff_hoist_down is used, and the felling head 5 is tilted backward.

The parameter ff_stick of the link mode can be divided into two parameters ff_stick_out and ff_stick_in, depending on the side on which the control stick 19 is in relation to the neutral position. For example, if the end of the stick boom 8 is transferred farther away and ff_stick_out is in use, then the tilting head 5 is tilted forward so that the position of the felling head 5 is maintained, for example the position P1. In a corresponding manner, if the end of the stick boom 8 is brought closer to the upper structure 3 and ff_stick_in is used, then the felling head 5 is tilted backwards.

In the parallel mode, the parameter ff_sl can be divided into two parameters ff_sl_out and ff_sl_in, depending on the side on which the control stick 19 is in relation to the neutral position, that is, the position in which the input/control value is zero. For example, when the felling head 5 is transferred farther away along the path 13, from the location L1 to the location L2, the parameter ff_sl_out is used and the felling head 5 is automatically tilted forward so that the position of the felling head 5, for example P1, is maintained. In a corresponding manner, when the felling head 5 is brought closer, the parameter ff_sl_in is in use and the felling head 5 is tilted backwards.

In this elucidating example, the parameters obtain values between a minimum value and a maximum value, for example from 0 to 100% (from 0.0 to 1.0). For example, if the value of the parameter ff_hoist_up is 50% and the y-direction of the control stick 20 gives a maximum set point 100% or the maximum input 32 for the hoist function, then the controlling variable of the tilting cylinder 7 or the output 34 is 50% of the maximum. In other words, the output 34 gives for example a 100% control to the controlling element 23 for moving the working cylinder 10 and a 50% control to the controlling element 22 for moving the working cylinder 7. With the parameters, the desired ratios are set for the speeds of movement of the working cylinders to keep the felling head 5 in the desired position.

If desired, the operation of the control algorithm for the levelling of the felling head can be easily adjusted with the parameters. For example, when the felling head levelling mode is activated, it can be deactivated for example in connection with a control stick or a direction of movement. The adjustment is made by setting the desired values for the parameters. For example, if it is desired that the levelling of the felling head is only active when running out but not running in the parallel movement, the parameter ff_sl_in is set to zero. In a corresponding manner, if, when running in the parallel movement, the levelling is to be activated only partly, i.e. by underlevelling, the value of the parameter ff_sl_in is set between zero and a parameter value giving full levelling. When the operation is to be overlevelling, the value of ff_sl_in is set greater than the parameter value giving full levelling.

In FIG. 4, the output 34 shows the control obtained by the control value, wherein 0% represents a closed valve and 100% represents a fully open valve. The output tilt_command is limited between −100% and +100%, wherein the negative direction and the positive direction represent tilting in different directions, starting for example from the position P1. The output −100% to 0% represents the first position of the valve and the output 0% to 100% represents the second position of the valve. When the output is 0%, the valve is in the central position shown in FIG. 3. Typically, the output tilt_command and also the outputs of the other movements are provided with ramp functions relating to the starting and stopping of the working cylinder, wherein for example the tilting cylinder 7 responds quickly to the movement of the control stick 19; that is, the ramp is short. The ramp used in connection with the parallel movement, in turn, may be long, wherein the movements are more gentle.

Mutual dependencies can be determined between outputs, for example between the outputs tilt_command and tilt_ff_command. For example, the output tilt_command can be prioritized in situations in which the control system detects that the driver is trying hard to control the tilting of the grapple manually in another direction than the control algorithm. The aim of the prioritizing is to guarantee that if desired, the driver can in all situations use manual control to obtain a maximal speed of motion for the tilting of the felling head.

Figure 5:
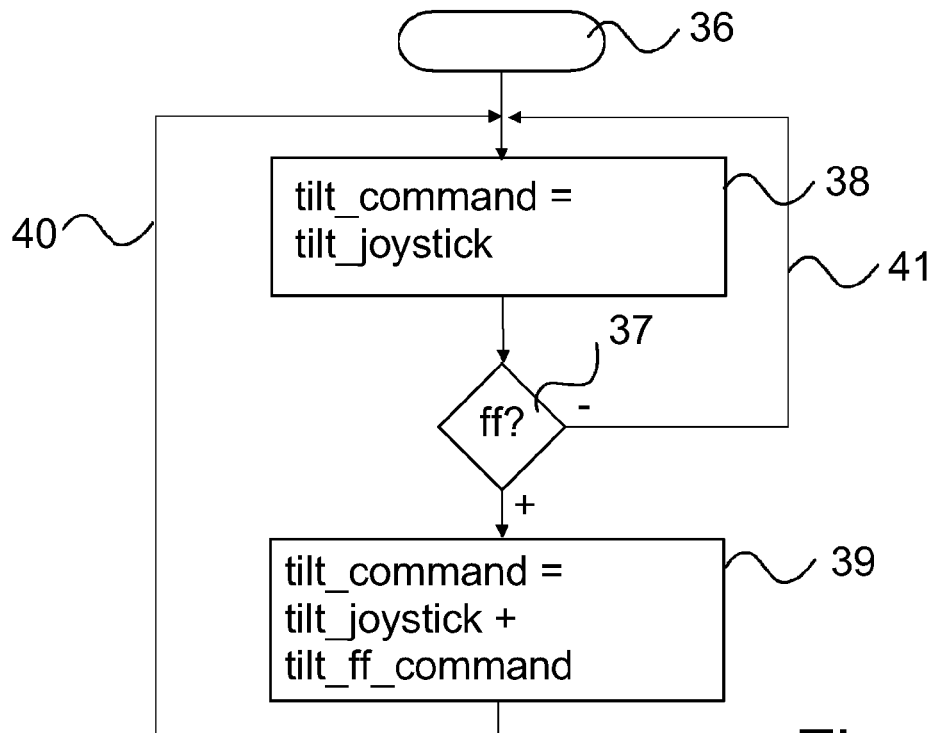
FIG. 5 illustrates the operation of the control system of FIG. 3 in more detail and its control principles in a flow chart.

FIG. 5 shows the operation of the control algorithm in more detail in a flow chart. The first step 38 of the procedure 36 is to calculate the output tilt_command that controls the tilting cylinder 7 and is proportional only to the input tilt_joystick of the manual control of the tilting of the felling head. The next step 37 is to examine if the felling head levelling mode is activated. If the levelling is not activated, the output already calculated is transferred further to a regulating element and the procedure returns via step 41 to the step 38. If the felling head levelling mode is in use, the next step will be step 39 in which the output tilt_command controlling the tilting cylinder 7 is also proportional to the dependence tilt_ff_command defined on the basis of the other inputs. From the manual control (tilt_joystick) and the levelling control (tilt_ff_command), one combined output can be calculated, which is transferred to the controlling element, and the procedure returns along line 40 to the step 38. The control system examines the status of the inputs and the activated mode continuously and determines continuously the presented dependence between the set points and the controlling variable.

Some examples of the invention have been described above in detail. Modifications and variations of the examples will be obvious for a person skilled in the art on the basis of the above description. The invention is not limited solely to the examples presented above, but it is defined according to the appended claims.

Having described the preferred embodiment, it will become apparent that various modifications can be made without departing from the scope of the invention as defined in the accompanying claims.

The invention claimed is:

1. A method for controlling a boom construction and a tool, the boom construction comprising a first end and an opposite second end, the first end connected to a working machine by articulation, the tool connected to the second end by articulation, the boom construction comprising a first boom and a first actuator controlling the same, a second boom articulated to the first boom and a second actuator controlling the second boom, and a third actuator controlling the position of the tool, wherein the method comprises the steps of:
    a control system selectively controlling simultaneously the first actuator with a first set point and the second actuator with a second set point in a link mode so as to control the first and second actuators in a manner independent of one another or controlling simultaneously the first and second actuators with the first set point and a third set point in a parallel mode for a parallel movement of the second end of the boom construction, and
    the control system controlling the third actuator in a tool-levelling mode that targets positioning the tool in a constant attitude during movement of the second end of the boom construction by using a variable dependent on the first and second set points when controlling the first and second actuators in the link mode and by using the variable dependent on the first and third set points when controlling the first and second actuators in the parallel mode.

2. The method according to claim 1, characterized in the control system controlling the third actuator in the tool-levelling mode with a fourth set point for tilting the tool forward or backward.

3. The method according to claim 2, characterized in that said variable is jointly proportional to the first, second and fourth set points when the link mode and the tool-levelling mode are active and jointly proportional to the first, third and fourth set points when the parallel mode and the tool-levelling mode are active.

4. The method according to claim 1, characterized in setting said set points by one or more manual control sticks.

5. The method according to claim 1, characterized in the control system controlling the third actuator with a controlling element, on which said variable is effective and which controls the volume flow of a medium to the third actuator.

6. The method according to claim 1, characterized in the control system controlling the third actuator in the tool-levelling mode with a fourth set point for tilting the tool forward or backward, said variable is jointly proportional to the first, second and fourth set points when the link mode and the tool-levelling mode are active and jointly proportional to the first, third, and fourth set points when the parallel mode and the tool-levelling mode are active.

7. The method according to claim 1, characterized in manually inputting the first, second, and third set points.

8. The method according to claim 1, characterized in that the too; is a felling head.

* * * * *